United States Patent [19]

Kono

[11] Patent Number: 5,160,875
[45] Date of Patent: Nov. 3, 1992

[54] DC MOTOR CONTROLLER WITH HIGH RELIABILITY

[75] Inventor: Mitsunobu Kono, Saitama, Japan

[73] Assignee: Kabushiki Kaisha Toshiba, Kawasaki, Japan

[21] Appl. No.: 580,585

[22] Filed: Sep. 11, 1990

[30] Foreign Application Priority Data

Sep. 11, 1989 [JP] Japan .................. 1-105400[U]

[51] Int. Cl.⁵ .............................................. H02P 3/00
[52] U.S. Cl. ........................................ 318/280; 318/258
[58] Field of Search ............................. 318/280-286, 318/273, 299, 370, 375, 376, 530, 531, 105, 108, 109, 300, 258, 56, 65, 374

[56] References Cited

U.S. PATENT DOCUMENTS

| | | | |
|---|---|---|---|
| 2,386,683 | 10/1945 | Hemphill | 318/531 |
| 3,584,281 | 6/1971 | Reeves et al. | 318/284 |
| 3,641,409 | 2/1972 | Maeda et al. | 318/280 X |
| 4,104,571 | 8/1987 | Gurwicz et al. | 318/375 |
| 4,145,641 | 3/1979 | Ozabi | 318/282 |
| 4,271,383 | 6/1981 | Endo | 318/375 |
| 4,275,340 | 6/1981 | Schleupen | 318/280 |
| 4,289,995 | 9/1981 | Sorber et al. | 318/282 |
| 4,303,872 | 12/1981 | Alf et al. | 318/280 X |
| 4,306,180 | 12/1981 | Moore et al. | 318/280 |
| 4,427,928 | 1/1984 | Kuriyama et al. | 318/376 |
| 4,455,517 | 6/1984 | Mitchell | 318/283 |
| 4,471,275 | 9/1984 | Comeau | 318/286 |
| 4,520,296 | 5/1985 | Lepper et al. | 318/282 X |
| 4,527,103 | 7/1985 | Kade . | |
| 4,562,387 | 12/1985 | Lehnhoff | 318/285 |
| 4,629,949 | 12/1986 | Senso | 318/374 X |
| 4,639,646 | 1/1987 | Harris et al. | 318/280 X |
| 4,680,513 | 7/1987 | Kennedy | 318/285 |
| 4,910,445 | 3/1990 | Borrmann | 318/286 |

FOREIGN PATENT DOCUMENTS

| | | |
|---|---|---|
| 0093555 | 11/1983 | European Pat. Off. . |
| 0275238 | 7/1988 | European Pat. Off. . |
| 1480054 | 7/1977 | United Kingdom . |
| 2029136 | 3/1980 | United Kingdom . |
| 2075289 | 11/1981 | United Kingdom . |

*Primary Examiner*—A. Jonathan Wysocki
*Attorney, Agent, or Firm*—Cushman, Darby & Cushman

[57] ABSTRACT

A power source circuit supplies positive and negative voltages to a DC motor. A first switching element is provided in a path for supplying a positive voltage from the power source circuit. A second switching element is provided in a path for supplying a negative voltage from the power source circuit. A driving circuit outputs an ON/OFF control signal for setting the first and second switching elements to opposite switching states in response to a forward/reverse rotation instruction for the DC motor. The driving circuit also outputs an OFF control signal for setting the first and second switching elements into the OFF state in response to a rotation interruption instruction. A short-circuiting circuit short-circuits both ends of the DC motor to brake the DC motor and interrupt the rotation thereof in response to the rotation interruption instruction.

18 Claims, 6 Drawing Sheets

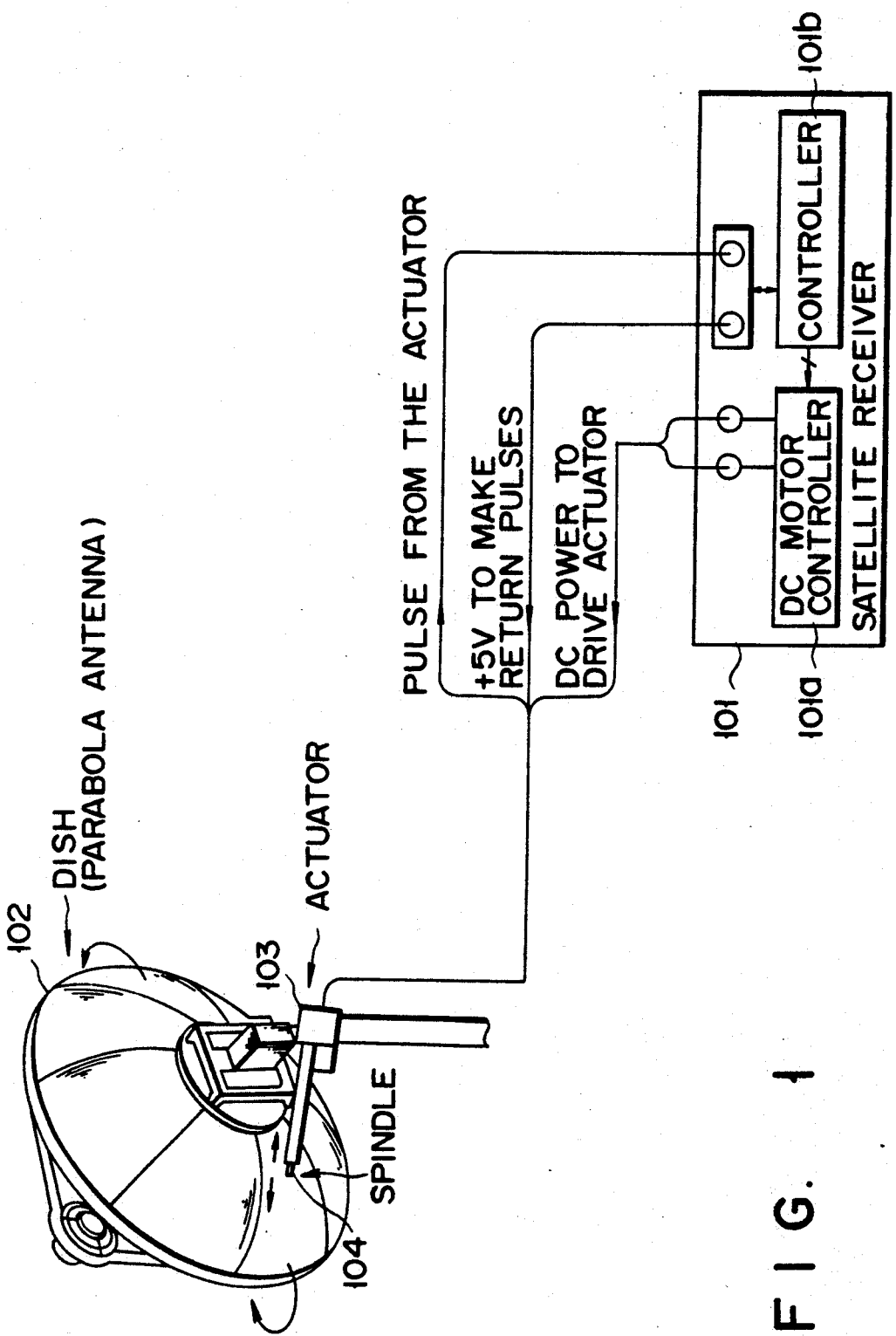
F I G. 1

DC MOTOR CONTROLLER WITH HIGH RELIABILITY

BACKGROUND OF THE INVENTION

1. Field of the Invention

The present invention relates to a DC motor controller such as a DC motor control circuit which can rotate a DC motor in a desired one of the forward and reverse directions and stop the rotating DC motor at a desired time (position) and which is suitably used for driving an actuator for changing the direction of a parabolic antenna for satellite broadcasting reception.

2. Description of the Related Art

In general, a DC motor can be easily handled in comparison with an AC motor and is frequently used since it is easy to change the rotation direction thereof. For example, in a satellite broadcasting reception system used in the United States of America, an actuator which is driven by a DC motor is mounted on a parabolic antenna (which is generally called a dish) and is constructed to be remotely controlled on the satellite broadcasting receiving side so as to automatically change the direction of the parabolic antenna towards a desired one of a plurality of satellites.

The conventional DC motor controller used for changing the direction of the parabolic antenna is shown in FIG. 6.

In FIG. 6, 1 denotes a power source transformer which has a primary winding L1 connected to receive an AC voltage from a commercial AC power source 2 and a secondary winding L2 connected to a rectifier 3. The rectifier 3 applies a DC voltage appearing between positive and negative voltage terminals P1 and P2 to a DC motor 13 via relays 7 and 11.

That is, the relay 7 is constructed by two-contact change-over switches 5 and 6 and a coil L7 and the relay 11 is constructed by two-contact change-over switches 9 and 10 and a coil L11. The contacts a of the switches 5 and 6 are respectively connected to the terminals P1 and P2 and the contacts b thereof are connected together. The contacts a of the switches 9 and 10 are respectively connected to the negative and positive voltage terminals P2 and P1 of the rectifier 3 and the contacts b thereof are commonly connected to a common contact c of the switches 5 and 6. Further, the common contacts c of the switches 9 and 10 are respectively connected to the positive and negative polarity terminals of the DC motor 13 via terminals P3 and P4. The coil L7 is connected between a bias terminal 4 to which a preset voltage V is applied and the collector of a transistor Q1 and the coil L11 is connected between the preset bias terminal 4 and the collector of a transistor Q2.

The transistors Q1 and Q2 are used for controlling the relays 7 and 11 and have emitters connected to the ground terminal and bases supplied with control signals from terminals 8 and 12.

The relays 7 and 11 change the polarity of a voltage from the rectifier 3 and then supplies the same to the DC motor 13 so that the DC motor 13 can be controlled to rotate in a forward or reverse direction.

With the above DC motor controller, when the DC motor 13 is rotated in a forward direction, a control signal supplied from a control circuit (not shown) to the control signal input terminal 8 is set to a high level and a control signal supplied from the control circuit to the control signal input terminal 12 is set to a low level. As a result, a current flows in the coil L7, no current is permitted to flow in the coil L11, the contacts a and c of the switches 5 and 6 are switches 9 and 10 are connected together. Therefore, the DC motor 13 is applied with positive and negative voltages at the positive and negative terminals, respectively. As a result, the DC motor 13 rotates in the forward direction.

In a case wherein the DC motor 13 which is rotating in the forward direction is stopped at a desired time (position), the control signal supplied to the control signal input terminal 8 is changed to a low level while the control signal supplied to the control signal input terminal 12 is kept at the low level. Then, no current is permitted to flow in the coils L7 and L11, and the contacts b and c of each of the switches 5, 6, 9 and 10 are connected together. As a result, the positive and negative terminals of the DC motor 13 are shortcircuited and a current caused by a counterelectromotive force flows in the DC motor 13 in a direction opposite to that of the current flowing at the time of forward rotation, thus instantaneously interrupting the rotation of the DC motor 13. This is because a braking force acts in such a manner that an inertia force in the forward rotating direction of the DC motor 13 can be cancelled by a driving force in the reverse rotating direction, and this explanation is omitted in the following description.

When the DC motor 13 is rotated in the reverse direction (which is hereinafter referred to as "reversely rotated"), a control signal supplied to the control signal input terminal 8 is set to the low level and a control signal supplied to the control signal input terminal 12 is set to the high level. As a result, a current flows in the coil L11, no current is permitted to flow in the coil L7, the contacts b and c of the switches 5 and 6 are connected together and the contacts a and c of the switches 9 and 10 are connected together. Therefore, negative and positive voltages are respectively applied to the positive and negative terminals of the DC motor 13, thereby reversely rotating the DC motor 13.

In a case wherein the DC motor 13 which is reversely rotated is stopped at a desired time (position), the control signal supplied to the control signal input terminal 12 is changed to the low level while the control signal supplied to the control signal input terminal 8 is kept at the low level. Then, the positive and negative terminals of the DC motor 13 are short-circuited in the same manner as in the case wherein the forwardly rotating motor 13 is stopped, and a current caused by a counterelectromotive force flows in the DC motor 13 in a direction opposite to that of the current flowing at the time of reverse rotation, thus instantaneously interrupting the rotation of the DC motor 13.

The conventional DC motor controller effects the rotation direction changing operation and rotation stopping operation by use of the relays 7 and 11. The relay 7 is constructed by the switches 5 and 6 and the relay 11 is constructed by the switches 9 and 10. Each of the switches 5, 6, 9 and 10 has two electrical contacts and therefore the DC motor controller has eight electrical contacts in total. Since the conventional DC motor controller has such a large number of electrical contacts, it tends to be damaged and the reliability thereof is low. The contacts are used for turning ON and OFF the direct current and are formed of expensive alloy (for example, silver-gold alloy). Therefore, the manufacturing cost thereof is high.

In short, the conventional DC motor controller has two relays each formed of two switches in order to rotate the DC motor in the forward and reverse directions and short-circuit the DC motor. Further, each of the switches has two electrical contacts and therefore eight electrical contacts in total are provided in the DC motor controller, thus causing malfunctions to occur frequently and lowering the reliability thereof.

That is, the above problems may occur because the relay contacts for turning ON and OFF the DC circuit permit a current to flow only in one direction and the contacts which will be melted by arcs occurring at the time of ON and OFF times are unconditionally determined.

SUMMARY OF THE INVENTION

It is, therefore, an object of the present invention to provide a new and improved DC motor controller in which the reliability can be enhanced by reducing the number of relay contacts used to a minimum to make the construction thereof simple.

According to a first aspect of this invention, there is provided a DC motor controller which can control a DC motor to rotate in the forward and reverse directions comprising:

a power source circuit for supplying positive and negative voltages to the DC motor;

a first switching element provided in a path via which the positive voltage from the power source circuit is supplied;

a second switching element provided in a path via which the negative voltage from the power source circuit is supplied;

driving means for outputting an ON-OFF control signal for controlling the first and second switching elements to set the first and second switching elements into opposite switching states in response to a forward or reverse rotation instruction for the DC motor and outputting an OFF control signal for setting the first and second switching elements into the OFF state in response to a rotation interruption instruction; and a short-circuiting circuit for short-circuiting both ends of the DC motor to brake the DC motor and interrupt the rotation thereof in response to the rotation interruption instruction.

According to a second aspect of this invention, there is provided a DC motor controller comprising:

DC voltage supplying means having first and second paths for supplying positive and negative voltages which are high enough to forwardly and reversely rotate a to-be-controlled DC motor;

a first relay having one responsive type contact provided in the first path of the DC voltage supplying means and a coil for driving the responsive type contact;

a second relay having one responsive type contact provided in the second path of the DC voltage supplying means and a coil for driving the responsive type contact;

first driving means for energizing the coil of the first relay in response to a forward rotation controlling signal supplied from an exterior for rotating the to-be-controlled DC motor in the forward direction and de-energizing the coil of the first relay in response to a forward rotation interruption controlling signal supplied from the exterior for interrupting the forward rotation of the to-be-controlled DC motor;

second driving means for energizing the coil of the second relay in response to a reverse rotation controlling signal for reversely rotating the to-be-controlled DC motor and de-energizing the coil of the second relay in response to a reverse rotation interruption controlling signal supplied from the exterior for interrupting the reverse rotation of the to-be-controlled DC motor; and braking means for short-circuiting the first and second paths in response to the forward rotation interruption controlling signal or reverse rotation interruption controlling signal to brake the to-be-controlled DC motor which is rotated in the forward or reverse direction.

According to a third aspect of this invention, there is provided a DC motor controller comprising DC voltage supplying means having first and second paths for supplying positive and negative voltages which are high enough to forwardly and reversely rotate a to-be-controlled DC motor;

a first semiconductor switching element provided in the first path of the DC voltage supplying means;

a second semiconductor switching element provided in the second path of the DC voltage supplying means;

first driving means for turning ON the first semiconductor switching element in response to a forward rotation controlling signal supplied from an exterior for rotating the to-be-controlled DC motor in the forward direction and turning OFF the first semiconductor switching element in response to a forward rotation interruption controlling signal supplied from the exterior for interrupting the forward rotation of the to-be-controlled DC motor;

second driving means for turning ON the second semiconductor switching element in response to a reverse rotation controlling signal supplied from the exterior for reversely rotating the to-be-controlled DC motor and turning OFF the second semiconductor switching element in response to a reverse rotation interruption controlling signal supplied from the exterior for interrupting the reverse rotation of the to-be-controlled DC motor; and braking means for short-circuiting the first and second paths in response to the forward rotation interruption controlling signal or reverse rotation interruption controlling signal to brake the to-be-controlled DC motor which is rotated in the forward or reverse direction.

With the above construction of this invention, the rotation direction of the DC motor can be changed by use of one, two or three relays each constructed by one or two electrical contacts. Therefore, the number of contacts used becomes extremely small in comparison with that in the conventional case, thereby lowering the cost and reducing the possibility of defective contacts to enhance the reliability thereof.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a diagram for schematically illustrating a direction controlling system for a satellite broadcasting receiving parabolic antenna to which a DC motor controller according to this invention is applied;

DETAILED DESCRIPTION OF THE PREFERRED EMBODIMENTS

Figure 2:
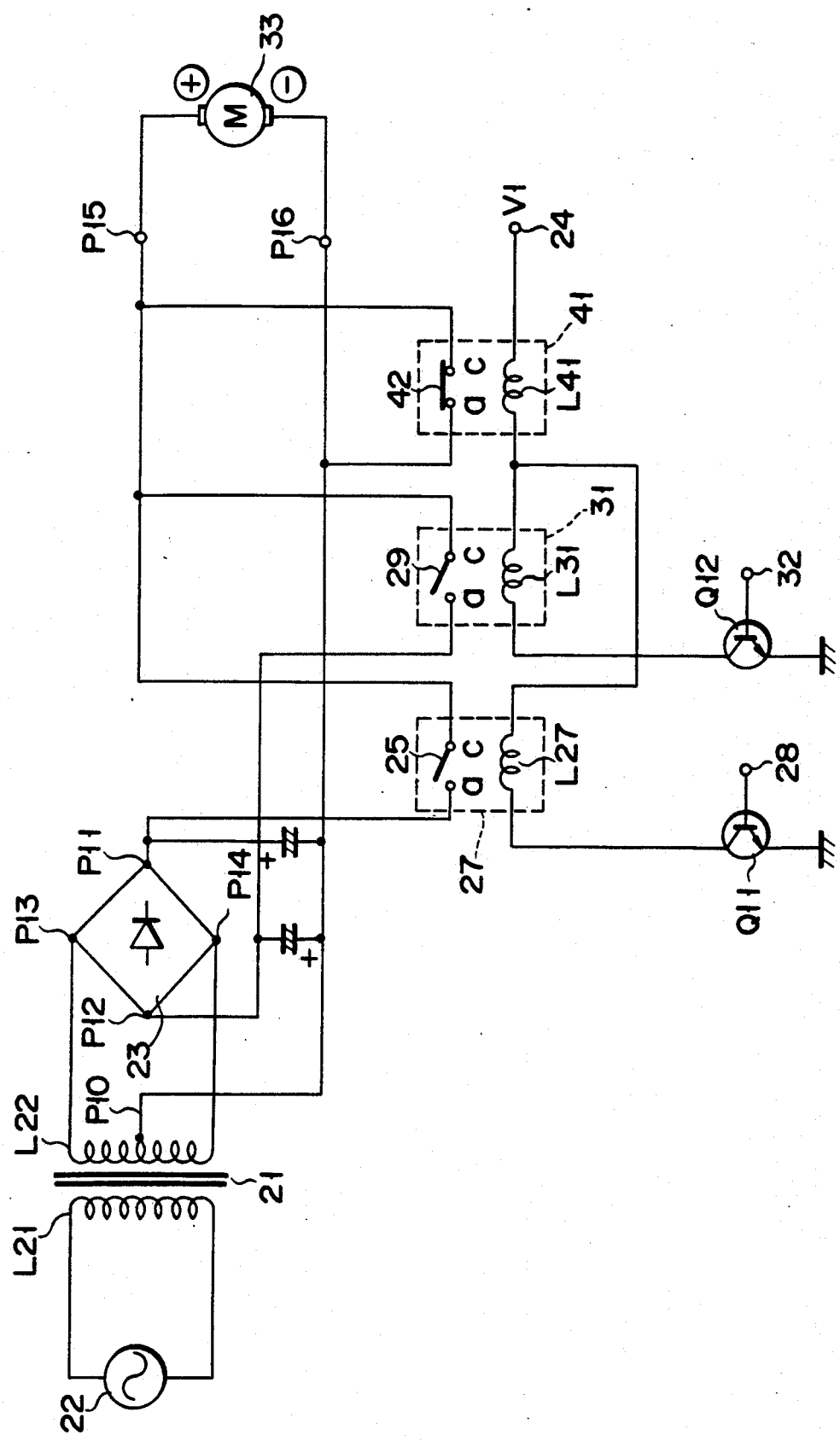
FIG. 2 is a circuit diagram showing a first embodiment of a DC motor controller according to this invention.

Reference will now be made in detail to the presently preferred embodiments of the invention as illustrated in the accompanying drawings, in which like reference characters designate like or corresponding parts throughout the several drawings.

First, a direction control system for a satellite receiving parabolic antenna (dish) to which a DC motor controller according to this invention is applied is schematically explained with reference to FIG. 1.

The satellite receiver 101 can memorize the satellite position. And when the desired satellite is selected, the receiver 101 controls the dish 102 to receive signals from the selected satellite. The receiver 101 provides +5V for the actuator 103. In response, the actuator 103 outputs digital pulses and sends them to the receiver 101. The receiver 101 counts the digital pulses from the actuator 103, recognizes the present dish position and controls the DC power for the actuator 103 to move the dish 102.

The spindle 104 can be moved forward or backward by the actuator 103. So, the dish 102 can be moved to east or west.

The role of a DC motor controller 101a is to control DC power supplied to the actuator 103 in order to move the parabolic antenna 102 to a preset position on the side of the receiver 101 according to the number of digital pulses sent from the actuator 103. A controller 101b supplies a control signal of low/high level corresponding to the number of digital pulses (also called return pulses).

Now, several embodiments of a DC motor controller according to this invention and used for a parabolic antenna direction controlling system described above are explained with reference to the accompanying drawings.

FIG. 2 is a circuit diagram showing a first embodiment of the DC motor controller according to this invention.

In FIG. 2, a power source transformer 21 has a primary winding L21 to which an AC voltage from a commercial AC power source 22 is applied and a voltage obtained by stepping down the AC voltage is derived from a secondary winding L22 thereof. Both ends of the secondary winding L22 are connected to AC input terminals P13 and P14 of a rectifier 23 and positive and negative voltage terminals P11 and P12 of the rectifier 23 are respectively connected to terminals P15 and P16 which are respectively connected to positive and negative terminals of the DC motor 33 via switches 25 and 29 of respective relays 27 and 31. Further, a normally closed switch 42 of a relay 41 is connected between the terminals P15 and P16.

In the relays 27, 31 and 41, control coils L27, L31 and L41 are connected as follows. That is, one end of the coil L41 is connected to a bias terminal 24 to which a voltage V1 is applied, and the other end thereof is connected to the ground terminal via a series connection of a coil L27 and the collector-emitter path of a transistor Q11 and is connected to the ground terminal via a series connection of a coil L31 and the collector-emitter path of a transistor Q12. The transistors Q11 and Q12 are used for controlling the relays 27 and 31 and the bases thereof are supplied with control signals from terminals 28 and 32.

An intermediate tap point P10 is provided on the secondary winding L22 and the tap point P10 is connected to the terminal P16.

With the DC motor controller with the above construction, when the DC motor 33 is rotated in the forward direction, a control signal supplied to the terminal 28 is set to the high level and a control signal supplied to the terminal 32 is set to the low level. As a result, a current flows in the coils L27 and L41, no current is permitted to flow in the coil L31, the switches 29 and 42 are turned OFF and the switch 25 is turned ON. Therefore, a positive voltage is applied to the positive terminal of the DC motor 33 with the negative terminal thereof kept connected to the tap point P10. As a result, the DC motor 33 rotates in the forward direction.

In a case wherein the DC motor 33 which is rotating in the forward direction is stopped at a desired time (position), the control signal supplied to the terminal 28 is changed to the low level while the control signal supplied to the terminal 32 is kept at the low level. Then, no current is permitted to flow in the coils L27, L31 and L41, the switch 42 is turned ON and the switches 25 and 29 are turned OFF. As a result, the positive and negative terminals of the DC motor 33 are short-circuited and a current caused by a counter-electromotive force flows in the DC motor 33 in a direction opposite to that of the current flowing at the time of forward rotation, thus instantaneously interrupting the rotation of the DC motor 33.

Further, when the DC motor is reversely rotated, a control signal supplied to the terminal 28 is set to the low level and a control signal supplied to the terminal 32 is set to the high level. As a result, a current flows in the coils L31 and L41, no current is permitted to flow in the coil L27, the switches 25 and 42 are turned OFF, and the switch 29 is turned ON. Therefore, a negative voltage is applied to the positive terminal of the DC motor 33 with the negative terminal thereof kept connected to the tap point P10. Thus, the DC motor 33 rotates in the reverse direction.

In a case wherein the DC motor 33 which is reversely rotated is stopped at a desired position, the control signal supplied to the terminal 32 is changed to the low level while the control signal supplied to the terminal 28 is kept at the low level. Then, in the same manner as in a case wherein the DC motor rotating in the forward direction is stopped, the switch 42 is turned ON and the positive and negative terminals of the DC motor 33 are short-circuited. As a result, a current caused by a counter-electromotive force flows in the DC motor 33 in a direction opposite to that of the current flowing at the time of reverse rotation, thus instantaneously interrupting the rotation of the DC motor 33.

In the DC motor controller of the above construction, each of the switches 25, 29 and 42 of the relays 27, 31 and 41 has a single electrical contact. The total number of electrical contacts is three. The number of the electrical contacts is less than half of eight which is the number of electrical contacts used in the conventional DC motor controller. Therefore, with the DC motor controller, the manufacturing cost can be reduced and the possibility of occurrence of defective contacts will be reduced to enhance the reliability thereof.

Figure 3:
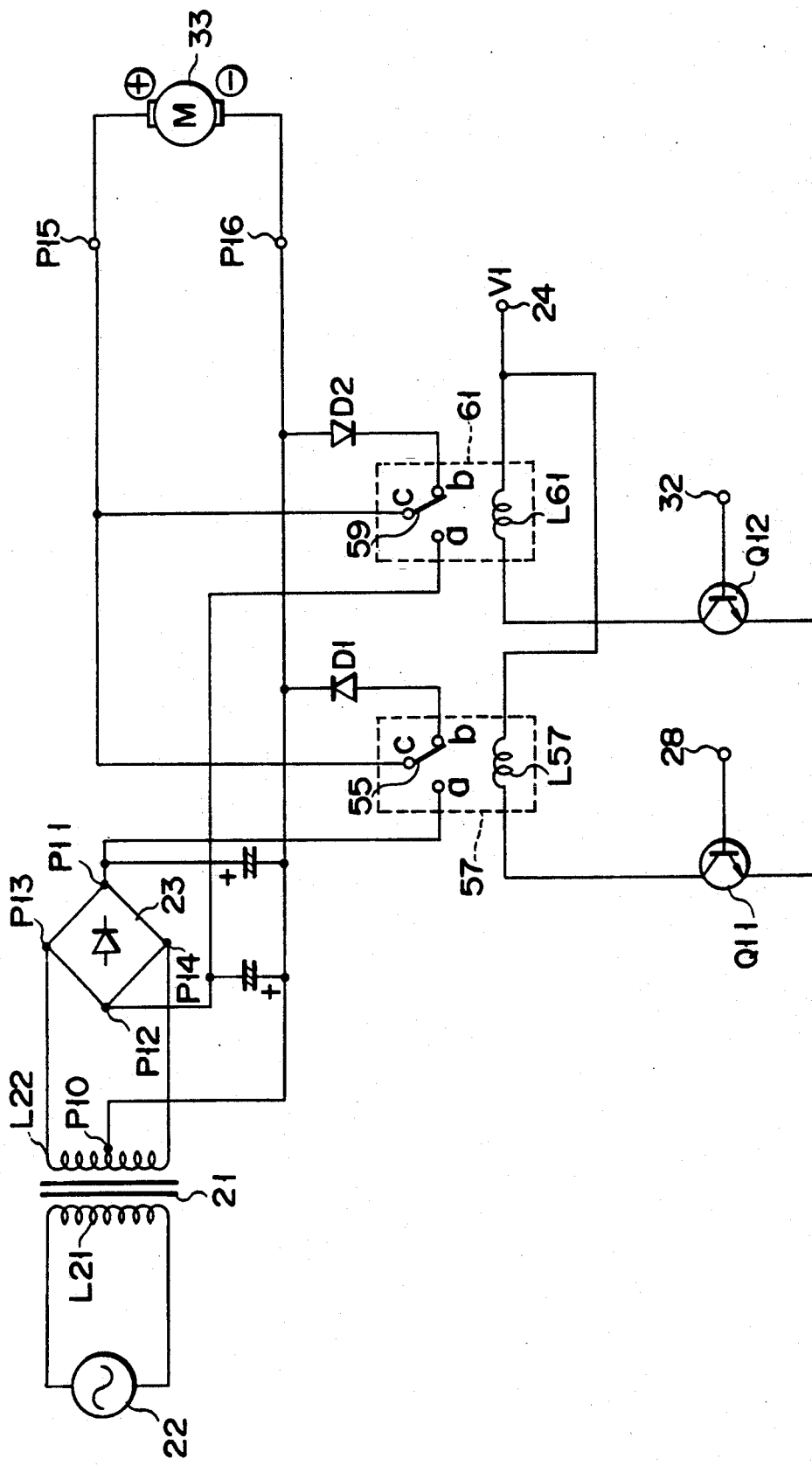
FIG. 3 is a circuit diagram showing a second embodiment of a DC motor controller according to this invention.

FIG. 3 is a circuit diagram showing a second embodiment of a DC motor controller according to this invention.

In this embodiment, relays 57 and 61 each having a two-contact change-over switch and diodes D1 and D2 are connected to control the DC motor 33.

The relay 57 is constructed by a switch 55 and a coil L57. The switch 55 has a first input terminal a connected to a terminal P11, a second input terminal b connected to a tap point P10 and a terminal P16 via the diode D1, and a common terminal c connected to a terminal P15.

The relay 61 is constructed by a switch 59 and a coil L61. The switch 59 has a first input terminal a connected to a terminal P12, a second input terminal b connected to the tap point P10 and the terminal P16 via the diode D2, and a common terminal c connected to the terminal P15.

The coils L57 and L61 are connected in the following manner. That is, the coil L57 is connected between a bias terminal 24 and the collector of a transistor Q11 and the coil L61 is connected between the bias terminal 24 and the collector of a transistor Q12. The transistors Q11 and Q12 are used for controlling the relays 57 and 61 and have emitters connected to the ground terminal and bases to which control signals from terminals 28 and 32 are supplied.

With the DC motor controller of the above construction, when the DC motor 33 is rotated in the forward direction, a control signal to the terminal 28 is set to the high level and a control signal to the terminal 32 is set to the low level. As a result, a current flows in the coil L57, no current is permitted to flow in the coil L61, the contacts a and c of the switch 55 are connected together, and the contacts b and c of the switch 59 are connected together. Therefore, a positive voltage is applied to the positive terminal of the DC motor 33 with the negative terminal thereof connected to the tap point P10. In this case, the positive and negative terminals of the DC motor 33 are connected to each other via the diode D2, but no current will flow in the diode D2 since the anode of the diode D2 is connected to the tap point and the cathode thereof is applied with a positive voltage so that the PN junction thereof is reversely biased As a result, the DC motor 33 rotates in the forward direction In a case wherein the DC motor 33 which is rotating in the forward direction is stopped at a desired time (position), the control signal to the terminal 28 is changed to the low level while the control signal to the terminal 32 is kept at the low level. Then, no current is permitted to flow in the coils L57 and L61 and the contacts b and c of each of the switches 55 and 59 are connected to each other. As a result, the positive terminal of the DC motor 33 is connected to the negative terminal thereof via the diode D1. At this time, the potential of the anode of the diode D1 is raised by the counter-electromotive force of the DC motor 33 and becomes higher than that of the cathode thereof, thus permitting a current to flow in the diode D1. This is equivalent to a state in which the positive and negative terminals of the DC motor 33 are short-circuited so that a current will flow in the DC motor 33 in a direction opposite to that of the current flowing at the time of forward rotation, thus instantaneously interrupting the rotation of the DC motor 33.

Further, when the DC motor 33 is reversely rotated, a control signal to the terminal 28 is set to the low level and a control signal to the terminal 32 is set to the high level. As a result, a current flows in the coil L61 of the relay 61, no current is permitted to flow in the coil L57, the contacts b and c of the switch 55 are connected to each other, and the contacts a and c of the switch 59 are connected to each other. Therefore, a negative voltage is applied to the positive terminal of the DC motor 33 with the negative terminal thereof connected to the tap point P10. In this case, like the diode D2 in the forward rotating operation, the PN junction of the diode D1 is reversely biased and no current is permitted to flow in the diode D1. Thus, the DC motor 33 is reversely rotated.

In a case wherein the DC motor 33 which is reversely rotated is stopped at a desired position, the control signal to the terminal 32 is changed to the low level while the control signal to the terminal 28 is kept at the low level. Then, no current is permitted to flow in the coils L57 and L61, and the contacts b and c of each of the switches 55 and 57 are connected to each other. As a result, the positive terminal of the DC motor 33 is connected to the negative terminal thereof via the diode D2. At this time, the potential of the anode of the diode D2 is raised by the counter-electromotive force of the DC motor 33 and becomes higher than that of the cathode thereof, thus permitting a current to flow in the diode D2. This is equivalent to a state in which the positive and negative terminals of the DC motor 33 are short-circuited, and a current flows in the DC motor 33 in a direction opposite to that of the current flowing at the time of reverse rotation, thus instantaneously interrupting the rotation of the DC motor 33.

In the DC motor controller of the above construction, the relays 57 and 61 are used to change the rotation direction and interrupt the rotation. Each of the switches 55 and 59 of the relays 57 and 61 has two electrical contacts, and therefore, the total number of electrical contacts is four. The number of the electrical contacts is equal to half of eight which is the number of electrical contacts used in the conventional DC motor controller. Therefore, like the embodiment shown in FIG. 2, the manufacturing cost can be reduced and the reliability thereof can be enhanced.

Figure 4:
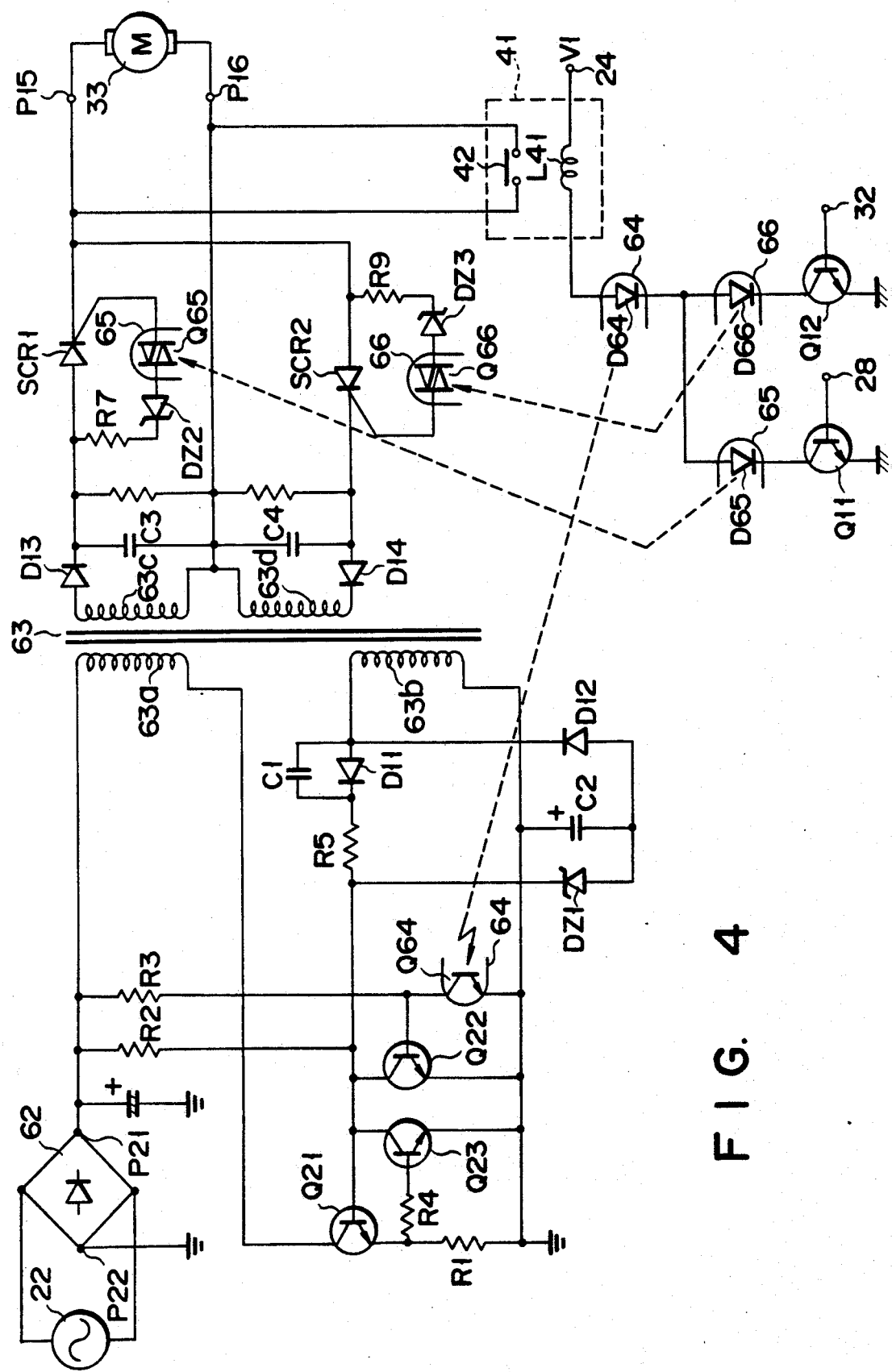
FIG. 4 is a circuit diagram showing a third embodiment of a DC motor controller according to this invention.

FIG. 4 is a circuit diagram showing a third embodiment of this invention which is constructed by using a ringing choke type switching power source, three photocouplers, a relay and two thyristors.

In a DC motor controller of FIG. 4, an input voltage to a switching power source is obtained by rectifying an output of a commercial AC power source 22 by a rectifier 62. 63 denotes a converter transformer having an input winding 63a and a driving winding 63b on the primary side and two output windings 63c and 63d on the secondary side. The positive voltage terminal P21 of the rectifier 62 is connected to the ground terminal via the input winding 63a, the collector-emitter path of a switching transistor Q21 and a resistor R1, and at the same time, connected to the base of the switching transistor Q21 via a starting resistor R2. The collector and emitter of each of transistors Q22 and Q23 are respectively connected to the base of the switching transistor Q21 and the ground terminal. The base of the transistor Q22 is connected to one end of a resistor R3 and the collector of a phototransistor Q64 which constitutes a photocoupler 64 in cooperation with a light emitting diode D64 as will be described later. The emitter of the phototransistor Q64 is grounded and the other end of the resistor R3 is connected to the positive voltage terminal P21. The base of the transistor Q23 is connected to the emitter of the switching transistor Q21 via a resistor R4. One end of the driving winding 63b is connected to the base of the switching transistor Q21 via a parallel circuit of a diode D11 connected with the polarities as shown in the drawing and a capacitor C1 and a resistor R5 and connected to the base of the switching transistor Q21 via a rectifier circuit formed of a rectifier diode D12 with the polarities as shown in the drawing and a smoothing capacitor C2 having one end grounded and a Zener diode DZ1 with the polarities as shown in the drawing acting as an output stabilizing circuit. The other end of the driving winding 63b is connected to the ground terminal.

One end of the output winding 63c is connected to the positive terminal of the DC motor 33 via a rectifier circuit of a rectifying diode D13 and a smoothing capacitor C3 and the anode-cathode electrode path of a thyristor SCR1. A gate circuit formed of a resistor R7, Zener diode DZ2 and triac Q65 which constitutes a photocoupler 65 in cooperation with a light emitting diode D65 as will be described later is connected between the anode and gate of the thyristor SCR1. The other end of the output winding 63c is connected to the negative terminal of the DC motor 33 via the terminal P16.

One end of the output winding 63d is connected to the terminal P15 via a rectifier circuit of a rectifier diode D14 with the polarities as shown in the drawing and a smoothing capacitor C4 and the cathode-anode path electrode path of a thyristor SCR2. A triac Q66 which constitutes a photocoupler 66 in cooperation with a light emitting diode D66 to be described later and a gate circuit formed of a Zener diode DZ3 with the polarities as shown in the drawing and a resistor R9 are connected between the anode and cathode of the thyristor SCR2 in the same manner as in the case of the thyristor SCR1. The other end of the output winding 63d is connected to the terminal P16. A normally closed switch 42 of a relay 41 is connected between the terminals P15 and P16.

The light emitting diodes D64, D65 and D66 and the controlling coil L41 of the relay 41 are connected in the following manner. That is, one end of the coil L41 is connected to the bias terminal 24 to which a voltage V1 is applied and the other end thereof is connected to the anode of the light emitting diode D64. The cathode of the light emitting diode D64 is connected to the ground terminal via the light emitting diode D65 with the polarities as shown in the drawing and the collector-emitter path of the transistor Q11 and is also connected to the ground terminal via the light emitting diode D66 with the polarities as shown in the drawing and the collector-emitter path of the transistor Q12. The transistors Q11 and Q12 are used to control the relay 41 and the photocouplers 64, 65 and 66 and the bases thereof are respectively supplied with control signals from the terminals 28 and 32.

In the DC motor controller with the above construction, when the DC motor 33 is rotated in the forward direction, a control signal supplied to the terminal 28 is set to the high level and a control signal supplied to the terminal 32 is set to the low level. As a result, a current flows in the coil L41 and light emitting diodes D64 and D65, no current is permitted to flow in the light emitting diode D66, the switch 42 and the triac Q66 are turned OFF and the phototransistor Q64 and triac Q65 are turned ON. Then, the switching transistor Q21 starts an oscillating operation and voltages across the coils 63c and 63d are raised. At this time, if a voltage which is obtained by rectifying and smoothing a voltage across the coil 63c and supplied from the capacitor C3 exceeds the Zener voltage of the Zener diode DZ2, it is applied to the gate of the thyristor SCR1 via the triac Q65 which has been set in the conductive state. Thus, the thyristor SCR1 is turned ON. Since the triac Q66 is set in the OFF state, the thyristor SCR2 is kept in the OFF state and a voltage generated in the coil 63d is not contributed to the control operation of the DC motor 33. As a result, a positive voltage is applied to the positive terminal of the DC motor 33 with the negative terminal thereof connected to the coupling point of the coils 63c and 63d, thereby rotating the DC motor 33 in the forward direction.

In a case wherein the DC motor 33 which is rotating in the forward direction is stopped at a desired time (position), the control signal to the terminal 28 is changed to the low level while the control signal to the terminal 32 is kept at the low level. Then, no current is permitted to flow in the coil L41 and light emitting diodes D64, D65 and D66, the switch 42 is turned ON and the phototransistor Q64 and the triacs Q65 and Q66 are turned OFF. As a result, the positive and negative terminals of the DC motor 33 are short-circuited and the rotation of the DC motor 33 is instantaneously interrupted. In this case, since the switching transistor Q21 is turned OFF by means of the photocoupler 64, a voltage between the anode and cathode of the thyristor SCR1 is limited to substantially 0 V, causing the thyristor SCR1 to be turned OFF.

Further, when the DC motor is reversely rotated, the control signal supplied to the terminal 28 is set to the low level and the control signal supplied to the terminal 32 is set to the high level. Then, a current flows in the coil L41 and light emitting diodes D64 and D66, no current is permitted to flow in the light emitting diode D65, the switch 42 and triac Q65 are turned OFF, and the phototransistor Q64 and triac Q66 are turned ON. Then, the switching transistor Q21 starts an oscillating operation and voltages across the coils 63c and 63d are raised. At this time, if a voltage which is obtained by rectifying and smoothing a voltage across the coil 63d and supplied from the capacitor C4 exceeds the Zener voltage of the Zener diode DZ3, it is applied to the gate of the thyristor SCR2 via the triac Q66 which has been set in the conductive state. Thus, the thyristor SCR2 is turned ON. Since the triac Q65 is set in the OFF state, the thyristor SCR1 is kept in the OFF state and a voltage generated in the coil 63c has no influence on the control operation of the DC motor 33. As a result, a negative voltage is applied to the positive terminal of the DC motor 33 with the negative terminal thereof connected to the coupling point of the coils 63c and 63d. Thus, the DC motor 33 rotates in the reverse direction.

In a case wherein the DC motor 33 which is reversely rotated is stopped at a desired time (position), the control signal to the terminal 32 is changed to the low level while the control signal to the terminal 28 is kept at the low level. Then, no current is permitted to flow in the coil L41, light emitting diodes D64, D65 and D66, the switch 42 is turned ON and the phototransistor Q64 and triacs Q65 and Q66 are turned OFF. As a result, the positive and negative terminals of the DC motor 33 are short-circuited, thus instantaneously interrupting the rotation of the DC motor 33. In this case, since the switching transistor Q21 is turned OFF by means of the photocoupler 64, a voltage between the anode and cathode of the thyristor SCR2 is limited to substantially 0 V, thereby turning OFF the thyristor SCR2.

As described above, in the DC motor controller shown in FIG. 4, no electrical contact is used in the thyristors SCR1 and SCR2 and photocouplers 64, 65 and 66 and only one electrical contact is used in the relay 41, so that the manufacturing cost can be reduced and the reliability can be enhanced in comparison with the conventional controller.

Figure 5:
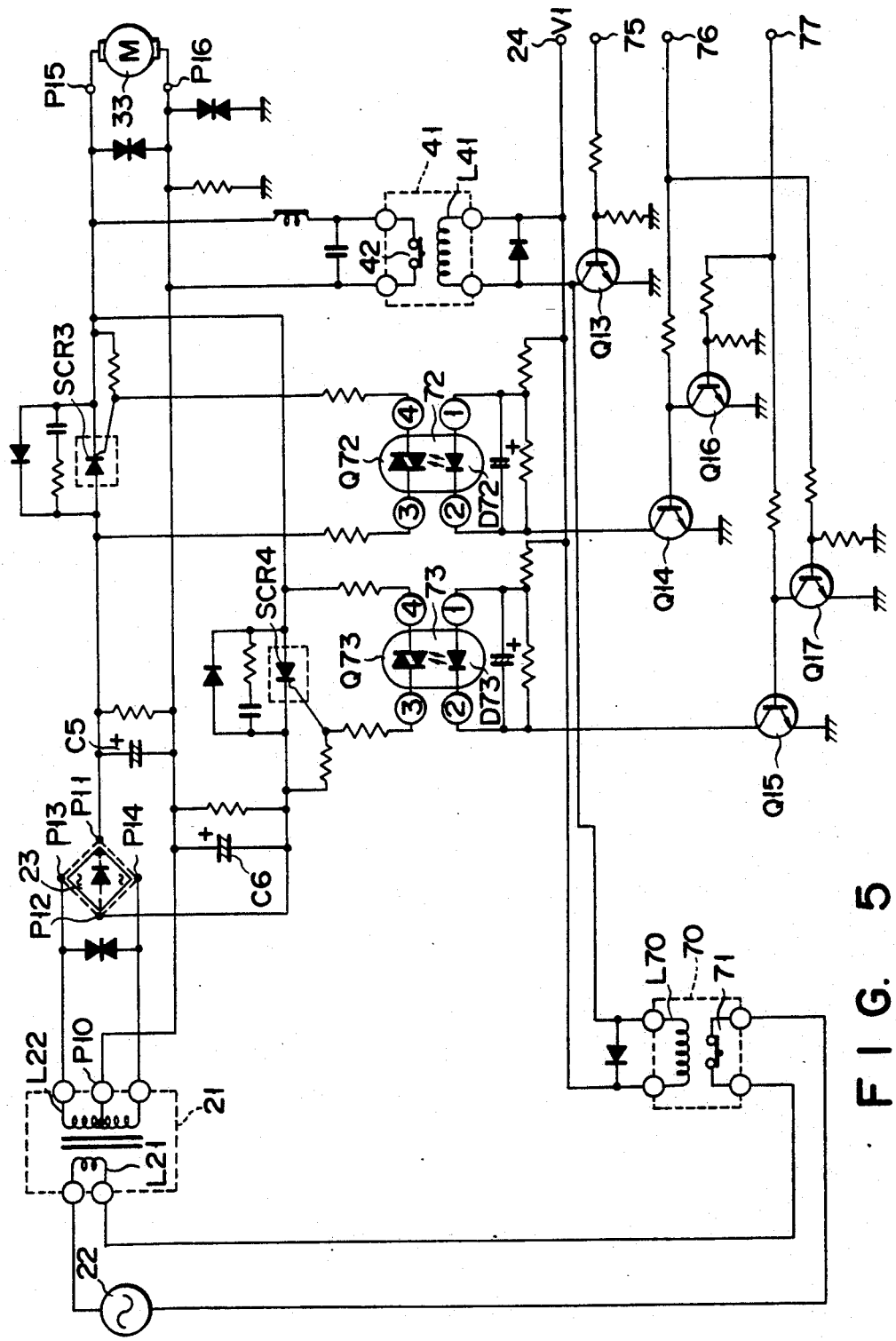
FIG. 5 is a circuit diagram showing a fourth embodiment of a DC motor controller according to this invention.
Figure 6:
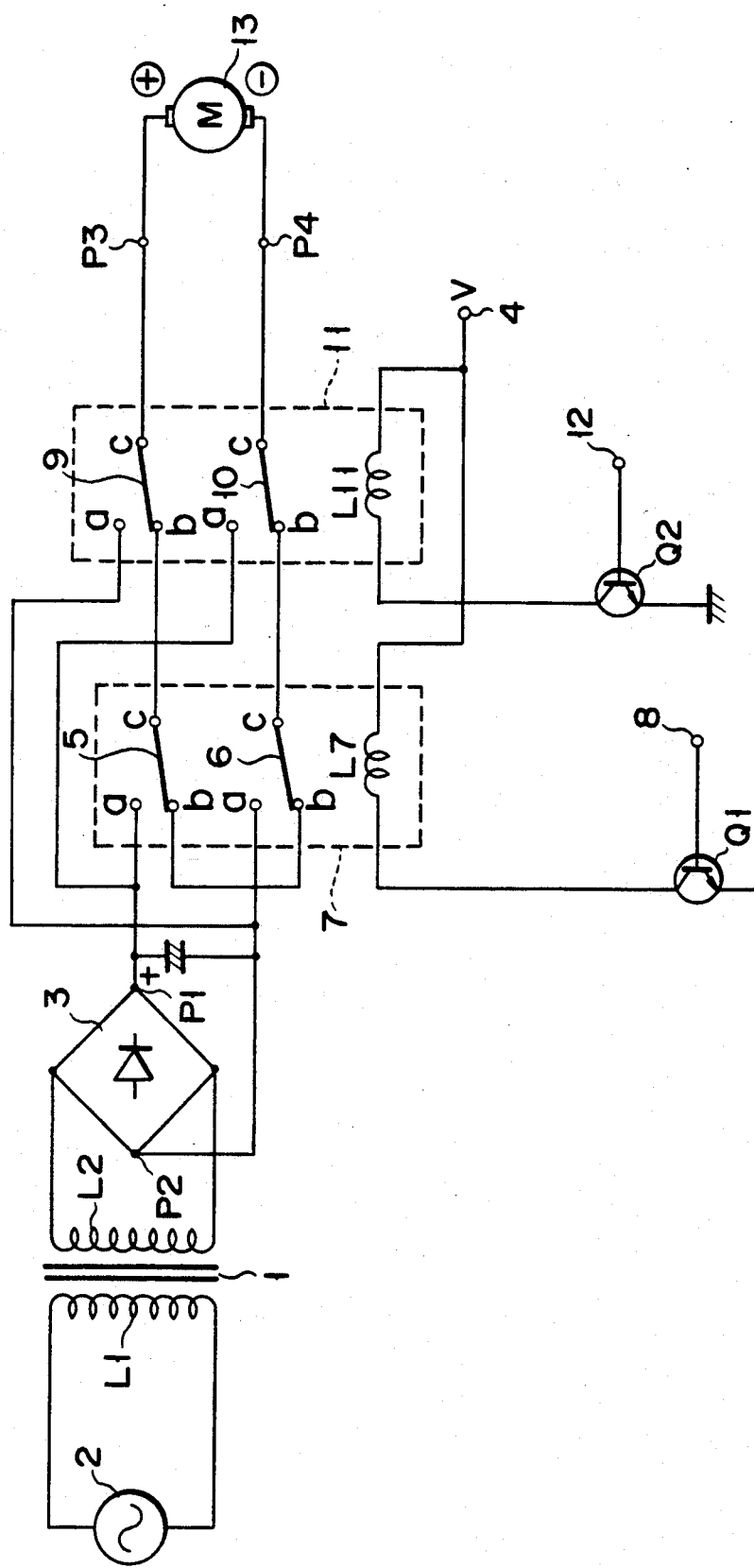
FIG. 6 is a circuit diagram showing the conventional DC motor controller.

FIG. 5 is a circuit diagram showing a fourth embodiment of this invention which is constructed by using two photocouplers 72 and 73, two relay contacts 42 and 71 and two thyristors SCR3 and SCR4.

This embodiment has a construction partly similar to the constructions shown in FIGS. 2 to 4 but is different from them in that three control signals are used and the relay 71 is connected to the primary side of the power source transformer 21.

Now, the operation of this embodiment is explained in respective cases of forward rotation and reverse rotation.

Forward Rotation

When a control signal of high level is supplied to a terminal 75, a transistor Q13 is turned ON and a current is permitted to flow from a bias terminal 24 to which a bias voltage V1 is applied to a coil L41 of the relay 41 and a coil L70 of the relay 70. As a result, the contact 71 of the relay 70 is closed, thereby causing an AC power source voltage to be applied to the primary winding L21 of the power source transformer 21. Therefore, an output induced in the secondary side of the power source transformer 21 is derived as a positive or negative DC voltage by means of a rectifier 23 and is charged on capacitors C5 and C6. Further, the contact 42 of the relay 41 is kept open.

Next, when a control signal of high level is applied to a terminal 76, a transistor Q14 is turned ON and a current is permitted to flow in a photodiode D72 of the photocoupler 72 so as to turn ON a triac Q72 of the photocoupler 72 so that a voltage charged on the capacitor C5 can be applied to the gate of the thyristor SCR3 via the triac Q72. Then, the thyristor SCR3 is turned ON to cause a positive voltage to be applied to the terminal P15, thereby causing the DC motor 33 to be rotated in the forward direction.

At this time, the potential of the terminal 77 is set at the low level, the transistor Q15 is set in the OFF state and the photocoupler 73 and thyristor SCR4 are also set in the OFF state.

In a case wherein rotation of the DC motor 33 is stopped at a desired time (position), a control signal to the terminal 76 is set to a low level to turn OFF the transistor Q14 and photocoupler 72 so as to prevent a voltage from being applied to the gate of the thyristor SCR3, and then the potential of the terminal 75 is set to the low level. As a result, the transistor Q13 is turned OFF to prevent a current from flowing in the coils L41 and L70 of the relays 41 and 71 so that the contact 71 will be opened, and as a result, no AC voltage is applied to the primary winding of the power source transformer 21 and no output is derived from the secondary side thereof. Further, the contact 42 is closed to short-circuit the terminals of the DC motor 33 and a current caused by a counter-electromotive force of the DC motor flows in the contact 42, thus instantaneously interrupting the rotation of the DC motor 33.

Reverse Rotation

When a control signal of high level is supplied to the terminal 75, the transistor Q13 is turned ON and the contact 71 of the relay 70 is closed, thereby causing an AC voltage to be applied to the primary winding L21 of the power source transformer 21, and an AC voltage induced on the secondary side is converted into a DC voltage by means of the rectifier 23 and then charged on of the relay 41 is kept open.

Next, when a control signal of high level is applied to the terminal 77, the transistor Q15 is turned ON and a current is permitted to flow in a photodiode D73 of the photocoupler 73 so as to turn ON a triac Q73 of the photocoupler 73. Then, a voltage charged on the capacitor C6 is applied to the gate of the thyristor SCR4 via the triac Q73, thus turning ON the thyristor SCR4. As a result, a negative voltage is applied to the terminal P16, thereby causing the DC motor 33 to be reversely rotated. At this time, the potential of the terminal 76 is set at the low level, the transistor Q14 is set in the OFF state and the photocoupler 72 and thyristor SCR3 are also set in the OFF state.

In a case wherein rotation of the DC motor 33 is stopped at a desired time (position), a control signal to the terminal 77 is set to the low level to turn OFF the transistor Q15 and photocoupler 73 so as to prevent a voltage from being applied to the gate of the thyristor SCR4, and then the potential of the terminal 75 is set to the low level. As a result, the transistor Q13 is turned OFF and the contact 71 of the relay 70 is set into the open state, and therefore, no AC voltage is applied to the primary winding L21 of the power source transformer 21 and no output is derived from the secondary side thereof. Further, the contact 42 is closed and a reverse current caused at the time of interruption of the DC motor flows in the contact 42, thus instantaneously interrupting the rotation of the DC motor 33.

According to this embodiment, the number of relay contacts used is two, but since one of them is used to switch the AC circuit and substantially one contact is used to switch the DC circuit, and this embodiment becomes equivalent to that of FIG. 4. Further, in this embodiment, the circuit construction is significantly simplified in comparison with that of FIG. 4.

As described above, according to this invention, the number of electrical contacts used for the DC motor controller can be effectively reduced so that the manufacturing cost of the DC motor controller can be lowered and the reliability thereof can be enhanced without making the switching circuit complicated in construction.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A DC motor controller which can control a DC motor having a first and second terminal to rotate in a forward and reverse direction, said controller comprising:

two independent power source circuits having first and second paths respectively for individually outputting positive and negative voltages with respect to a common path, said common path being directly connected to said second terminal of said DC motor;

a first switch element provided between the first path which outputs the positive voltage and said first terminal of the DC motor;

a second switch element provided between the second path which outputs the negative voltage and said first terminal of the DC motor;

driving means for outputting an ON-OFF control signal for controlling said first and second switching elements to set said first and second switching elements into opposite switching states in response to a forward or reverse rotation instruction for said DC motor, and for outputting an OFF control signal for setting both said first and second switching elements into the OFF state in response to a rotation interruption instruction; and a short circuiting circuit for substantially and directly connecting said first and second terminals of said DC motor to brake the DC motor and interrupt the rotation thereof in response to the rotation interruption instruction.

2. A DC motor controller according to claim 1, wherein said first and second switching elements each includes a relay having a coil which is energized/de-energized by an ON/OFF control signal from said driving means and a responsive type contact driven by said coil.

3. A DC motor controller according to claim 1, wherein said first and second switching elements each includes a semiconductor switching element which is turned ON or OFF by an ON/OFF control signal from said driving means.

4. A DC motor controller according to claim 1, wherein said short-circuiting circuit includes a relay having a coil energized by a bias voltage and a normally closed contact driven by said coil.

5. A DC motor controller comprising:

DC voltage supplying means having first, second, and common paths, said first and second paths supplying positive and negative voltages whose magnitudes with respect to said common path are large enough to forwardly and reversely rotate a to-be-controlled DC motor, said common path being directly connected to a terminal of said to-be-controlled DC motor;

a first relay having one respective type contact provided in said first path of said DC voltage supplying means a coil for driving said responsive type contact;

a second relay having one responsive type contact provided in said second path of said DC voltage supplying means and a coil for driving said responsive type contact;

first driving means for energizing said coil of said first relay in response to a forward rotation controlling signal supplied from an exterior for rotating said to-be-controlled DC motor in the forward direction and de-energizing said coil of said first relay in response to a forward rotation interruption controlling signal externally supplied thereto for interrupting the forward rotation of said to-be-controlled DC motor;

second driving means for energizing said coil of said second relay in response to a reverse rotation controlling signal for reversely rotating said to-be-controlled DC motor and de-energizing said coil of said second relay in response to a reverse rotation interruption controlling signal externally supplied thereto for interrupting the reverse rotation of said to-be-controlled DC motor; and braking means for directly connecting terminals of said DC motor in response to the forward rotation interruption controlling signal or reverse rotation interruption controlling signal to brake said to-be-controlled DC motor which is rotated in the forward or reverse direction.

6. A DC motor controller according to claim 5, wherein said braking means includes a third relay having a coil energized by a bias voltage and a normally closed contact driven by said coil.

7. A DC motor controller according to claim 5, wherein said braking means includes first and second normally closed contacts respectively provided for said first and second relays and first and second diodes respectively connected between said first and second normally closed contacts and said first and second paths.

8. A DC motor controller for controlling the rotation of a DC motor having a first and second terminal, the DC motor controller comprising:

DC voltage supplying means having first, second, and common paths, the first path for supplying a first voltage to the first terminal of the DC motor, the second path for supplying a second voltage to the first terminal of the DC motor, and the common path directly connected to the second terminal of the DC motor, the first voltage being a positive voltage between the first path and the common path and the second voltage being a negative voltage between the second path and the common path, the first and second voltage having magnitudes large enough to forwardly and reversely rotate the DC motor;

a first semiconductor switching element provided in said first path of said DC voltage supplying means;

a second semiconductor switching element provided in said second path of said DC voltage supplying means;

first driving means for turning ON said first semiconductor switching element in response to a forward rotation controlling signal externally supplied thereto for rotating said DC motor in a forward direction and turning OFF said first semiconductor switching element in response to a forward rotation interruption controlling signal supplied from the exterior for interrupting the forward rotation of said DC motor;

second driving means for turning ON said second semiconductor switching element in response to a reverse rotation controlling signal supplied from the exterior for reversely rotating said DC motor and turning OFF said second semiconductor switching element in response to a reverse rotation interruption controlling signal supplied from the exterior for interrupting the reverse rotation of said DC motor; and braking means for substantially and directly connecting said first and second terminals of said DC motor in response to the forward rotation interruption controlling signal or reverse rotation interruption controlling signal to brake said DC motor.

9. A DC motor controller according to claim 8, wherein said braking means includes a relay having a coil energized by a bias voltage and a normally closed contact driven by said coil.

10. A DC motor controller according to claim 8, wherein said DC voltage supplying means includes a ringing choke type switching power source.

11. A DC motor controller according to claim 8, wherein said first and second semiconductor switching elements each have a thyristor.

12. A DC motor controller according to claim 11, wherein said first and second driving means each include a photocoupler for effecting the gate control for said thyristor.

13. A DC motor controller according to claim 10, wherein said first and second driving means include means for causing an oscillation in said ringing choke type switching power source.

14. A DC motor controller according to claim 13, wherein said means for causing an oscillation includes a light emitting section of a photocoupler.

15. A DC motor controller according to claim 8, wherein said DC voltage supplying means includes a power source transformer receiving a commercial AC voltage on a primary side of the transformer, a rectifier for rectifying outputs from a centertapped secondary side of said power source transformer to output on the first and second paths the first, positive, and the second, negative, voltages with respect to the common, centertapped, path, and two capacitors for respectively charging the first and second voltages output from the rectifier.

16. A DC motor controller according to claim 15, wherein said first and second driving means include a relay having a coil energized by a biasing voltage when one of the forward and reverse rotation interruption controlling signals is supplied, and a normally open contact driven by said coil and provided on the primary side of said power source transformer, wherein said first and second driving means can turn off the first and second semiconductor switching elements, respectively.

17. A DC motor controller which can control a DC motor to rotate in a forward direction and a reverse direction, said DC motor having a first terminal and a second terminal, an electrical current flowing from said first terminal through the DC motor and out said second terminal when said DC motor rotates in the forward direction, an electrical current flowing from said second terminal through the DC motor and out said first terminal when said DC motor rotates in the reverse direction, said controller comprising:

a power source means, having a first terminal, a second terminal, and a common terminal, for supplying a positive voltage from said first terminal of said power source means with respect to said common terminal of said power source means, and for supplying a negative voltage from said second terminal of said power source means with respect to said common terminal of said power source means, said common terminal of the power source means being connected to said second terminal of said DC motor;

a first switching element provided in a path leading from the first terminal of the power source means to the first terminal of the DC motor via which the positive voltage from said power source means is supplied to said DC motor;

a second switching element provided in a path leading from the second terminal of the power source means to the first terminal of the DC motor via which the negative voltage from said power source means is supplied to said DC motor;

driving means for outputting an ON-OFF control signal for controlling said first and second switching elements to set said first and second switching elements into opposite switching states in response to a forward or reverse rotation instruction for said DC motor, and for outputting an OFF control signal for setting both said first and second switching elements into the OFF state in response to a rotation interruption instruction; and a short-circuiting means for substantially and directly short-circuiting said first and second terminals of said DC motor together to brake the DC motor and to interrupt rotation of said DC motor in response to the rotation interruption instruction.

18. A DC motor controller for controlling a DC motor, the DC motor having a first and a second terminal, the DC motor controller comprising:

DC voltage supplying means having a first terminal, a second terminal, and a common terminal, for supplying a positive DC voltage from said first terminal of said DC voltage supplying means with respect to said common terminal of said DC voltage supplying means, and for supplying a negative DC voltage from said second terminal of said DC voltage supplying means with respect to said common terminal of said DC voltage supplying means, the positive and negative DC voltages having magnitudes which are large enough to forwardly and reversely rotate said DC motor;

a first relay means, having one response type contact, for connecting said first terminal of said DC voltage supplying means to said first terminal of said DC motor via a first path or to an output terminal of the first relay means, said first relay means also having a coil for driving said responsive type contact;

a second relay means, having one responsive type contact, for connecting said second terminal of said DC voltage supplying means to said first terminal of said DC motor via a second path or to an output terminal of the second relay means, said second relay means also having a coil for driving said responsive type contact;

first driving means for energizing said coil of said first relay means in response to a forward rotation controlling signal supplied from an exterior for rotating said DC motor in the forward direction, and for de-energizing said coil of said first relay means in response to a forward rotation interruption controlling signal supplied from the exterior for interrupting the forward rotation of said DC motor;

second driving means for energizing said coil of said second relay means in response to a reverse rotation controlling signal for reversely rotating said DC motor, and for de-energizing said coil of said second relay means in response to a reverse rotation interruption controlling signal supplied from the exterior for interrupting the reverse rotation of said DC motor; and braking means, connected between said output terminal of said first relay means and said second terminal of said DC motor, and also being connected between said output terminal of said second relay means and said second terminal of said DC motor, for substantially and directly short-circuiting said first and second terminals of said DC motor together in response to the forward rotation interruption controlling signal or reverse rotation interruption controlling signal to brake said DC motor.

* * * * *